(No Model.) 2 Sheets—Sheet 1.

M. J. WIGHTMAN.
ALTERNATING CURRENT MOTOR.

No. 476,346. Patented June 7, 1892.

Witnesses
Ira R. Steward
Hm. H. Capel

Inventor
Merle J. Wightman

By Attorney
H. L. Townsend (No Model.) 2 Sheets—Sheet 2.
M. J. WIGHTMAN.
ALTERNATING CURRENT MOTOR.
No. 476,346. Patented June 7, 1892.
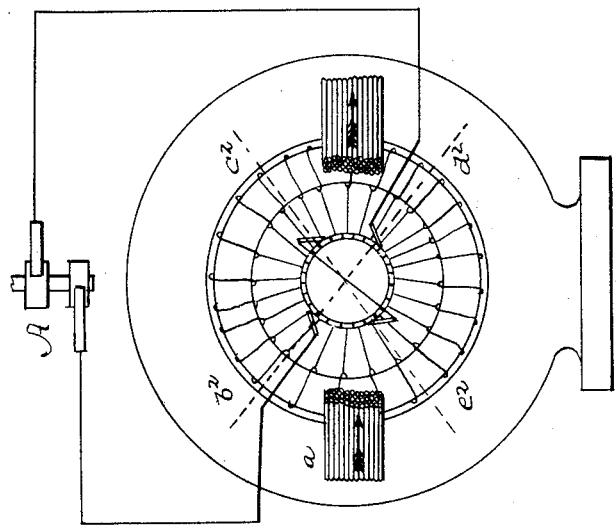
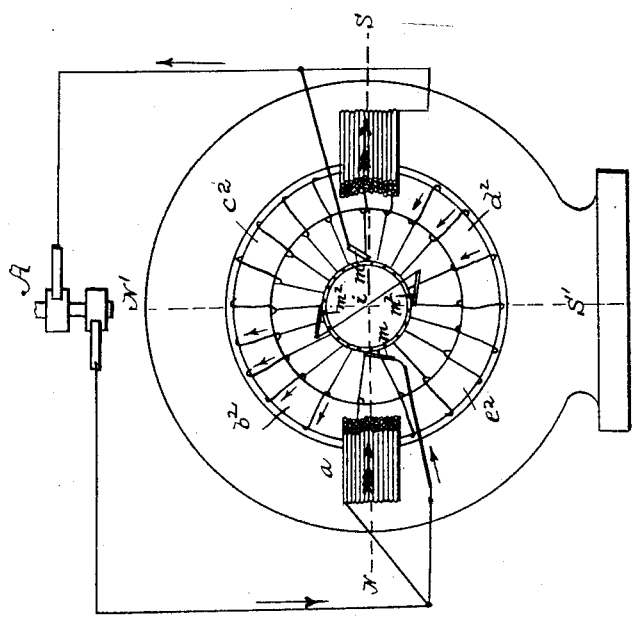
Witnesses
Ira R. Steward
Fred H. Capel
Inventor
Merle J. Wightman
By Attorney
H. C. Townsend

UNITED STATES PATENT OFFICE.

MERLE J. WIGHTMAN, OF LYNN, MASSACHUSETTS, ASSIGNOR TO THE THOMSON HOUSTON ELECTRIC COMPANY, OF CONNECTICUT.

ALTERNATING-CURRENT MOTOR.

SPECIFICATION forming part of Letters Patent No. 476,346, dated June 7, 1892.

Application filed November 14, 1888. Serial No. 290,833. (No model.)

*To all whom it may concern:*

Be it known that I, MERLE J. WIGHTMAN, a citizen of the United States, and a resident of Lynn, in the county of Essex and State of Massachusetts, have invented a certain new and useful Alternating - Current Motor, of which the following is a specification.

My invention relates to electric motors in which the exciting or operating current alternates—that is to say, rapidly changes in polarity.

It has heretofore been proposed, as in Patent No. 363,185, to operate an alternating-current motor by repulsion, the repulsion being due to the persistence of the induced currents set up in the armature through the action of alternations in a field, or vice versa. In my present invention I employ the principle of repulsion; but the alternating currents in both field-magnet coil and armature are both directly derived from an external source of current, which current is led through the two members in such direction that the synchronous alternations will each cause repulsion between them. The source may be of any desired nature—as, for instance, an alternating dynamo or a transformer. I find in practice that the best results are obtained by connecting the field-magnet coil and armature in multiple to the alternating-current wire leading from the source.

A simple form of motor embodying my invention would consist of an armature and field - magnet such as shown in the patent before referred to, the connections to the open-circuited coils of the armature being made such that as they successively come into circuit with the source they will carry alternating currents from the same, each of which will be in opposite direction to the simultaneously-flowing alternating current in the field-magnet coil.

Figure 3:
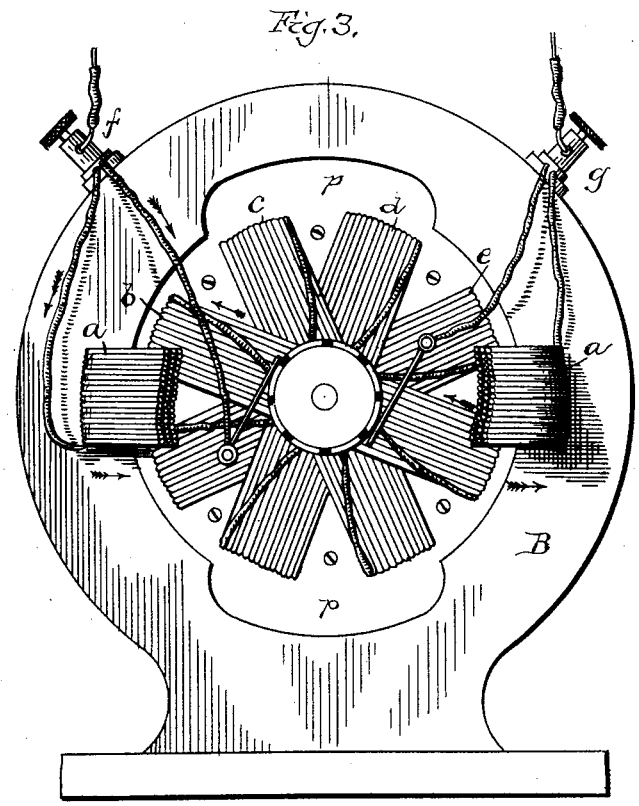
Figure 1:
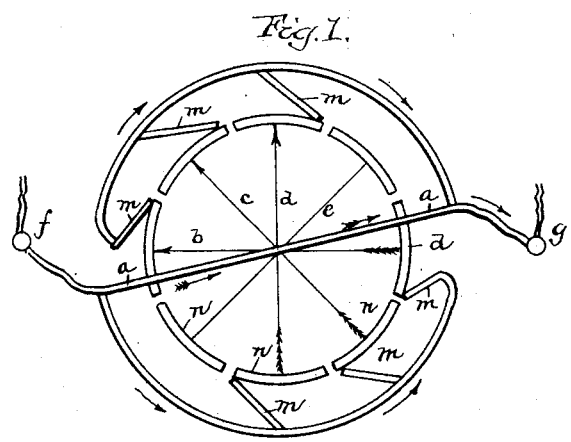
Figure 2:
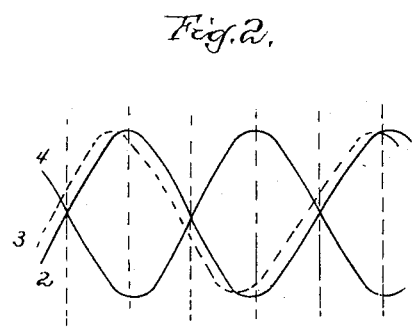

In the accompanying drawings, Figure 1 is a diagram illustrating the principle of my invention. Fig. 2 is a diagram of phases of currents. Fig. 3 is a side elevation of a simple form of motor embodying the invention. Fig. 4 is a side elevation of another form of motor embodying the invention. Fig. 5 shows the same motor with a modification in the disposition of the commutator.

A successful alternating motor must have very little self-induction, which is due to the fact that the current alternates. The difficulty in using an ordinary series or shunt motor for alternating currents comes from this cause. Part of the motive effort results from the attraction between parallel currents or unlike poles. This portion of the motor is the part which has the greatest self-induction—that is, offers the greatest hinderance to the flow of currents, which vary in strength. The principle of my motor is to cut out of action those portions of the motor which have a great self-induction. This can only be done by utilizing the repulsive effect and throwing away the attraction or using its self-inductive effect to take coils out of circuit, as hereinafter explained.

In the diagrammatic arrangement shown in Fig. 1 I have used a simple line, illustrating the direction of current, to represent what would be a coil in regular construction. Conductor $a$, supposed to be fixed, is connected between two posts $f\ g$, joined to a source of alternating currents. Other conductors $b\ c\ d\ e$, &c., capable of revolving on their centers into and out of parallelism with $a$, are put into circuit between $f$ and $g$ by means of commutating devices consisting of plates and brushes $n\ m$, but in such way that while they are in circuit repulsion between them and conductor $a$ will exist with each alternation of current. The conductors $b\ c\ d\ e$ correspond to the revolving armature-conductors of the motor shown in the patent referred to and conductor $a$ to the fixed or field conductor. For instance, if a current is flowing in conductor $a$, Fig. 1, the current is caused to flow in conductor $b$ of armature in an opposite direction. The conductors will react on each other to produce repulsion, and motion of the conductor $b$ in the direction of the arrow will result. As conductor $b$ moves away from conductor $a$ the repulsion would naturally grow less, and when the conductor $b$ is at right angles with $a$ it should theoretically be cut out of circuit; but since the current is still flowing in this conductor it cannot be cut out of circuit without producing considerable sparking, so that it is found necessary to allow it to remain in circuit for some further part of the revolution or until its current gets partly into parallelism again with conductor $a$. In this position the reaction of the two conductors would tend to increase self-induction of the conductor $b$, and it will finaly reach a point when its self-induction is so great as to prevent any current from flowing through it. At this point it can be cut out of circuit without any spark. The arrangement in this simplest form resembles very much the open-circuit continuous-current motor of the old Siemens type; but it is well known that the latter is not adapted for use as an alternating-current motor.

The effect of my motor with equal currents in the two coils is to produce a strong repulsion from the fact that the alterations must necessarily be one hundred and eighty degrees apart, as shown in Fig. 2. Curve 2 would represent current in the field or stationary coil, and curve 4 represent current in the movable armature. In the motor of the patent the difference of phase probably never quite reaches one hundred and eighty degrees and might be represented by curve 3. It will be seen that there is a greater repulsion between 2 and 4 than between 4 and 3.

Fig. 3 shows a practical arrangement of the motor. Coil $a$ is the inducing or field coil supported in a suitable iron frame B, and coils $b\ c\ d\ e$ the rotary armature-coils. It has been found that by cutting away a portion of the field-magnet at $h$ it is possible to cut the coils from the circuit without allowing them to rotate as far as would otherwise be necessary. This is, however, no part of the present invention.

In Fig. 4 I have shown the manner of obtaining the repulsive effect with closed-circuit armature of either the Siemens or Gramme ring form. This arrangement is slightly different from the foregoing, but resembles it in the fact that repulsion occurs between the simultaneous impulses in the field-magnet and armature. $a$ represents the field-coil, and $b^2\ c^2\ d^2\ e^2$ are quarter-sections of the armature-circuit. Brushes $m\ m$ bear on the regular commutator at a position directly beneath the coil $a$. Two other brushes $m^2\ m^2$ make a contact on the commutator at a point ninety degrees from the brushes $m\ m$. The brushes $m^2\ m^2$ directly connect with one another by a short conductor. The result is that the current flowing in the quarters $b^2\ d^2$ of the ring is in such a direction as to be repelled by the current flowing in $a$. This is due to the fact that the induced current in sections $c^2\ e^2$ of the armature, due to the influence of the coil $a$, is opposed in direction to the current flowing in from dynamo A through the brushes $m\ m$—that is, in the quarter-sections $c^2\ e^2$ no current flows, while in the segments $b^2\ d^2$ the inductive influence of $a$ and flow of current through brushes $m\ m$ are in like direction. Consequently the direction of the current with a given alternation is through brush $m$, through section $b^2$ of armature, out at upper brush $m^2$, in at lower brush $m^2$, through section $d^2$, and out at opposite brush $m$. The direction of these currents being opposed to those in the coils $a$, rotation of the armature is the result. It is found in practice with this arrangement that better results are obtained when the brushes are displaced, as shown in Fig. 5. I have not been able to obtain an entirely satisfactory explanation of this result, but have concluded that it is due to the influence of distortion in the armature relatively to the coil $a$ or to some difference in the lag of the two currents flowing in them. The principle of action is doubtless, however, the same as described in connection with Fig. 4.

What I claim as my invention is—

1. The combination, substantially as described, of a source of alternating currents, an armature, and a field-magnet, said armature and field-magnet being both supplied from said source with alternating currents conveyed through them in a direction to set up repulsion between armature and field at each alternation, and means for keeping out of circuit those portions of the armature between which and the field attraction exists.

2. The combination, substantially as described, of an alternating-current field-magnet and an alternating-current armature, both supplied with synchronous currents from an external source, and a commutator by which the armature-coils in one half of the magnetic field or fields are cut out of circuit, the coils in the remaining half being alone used for producing the motive power.

3. The combination, substantially as described, of an alternating-current field-magnet, an alternating-current armature supplied with alternating currents passing through the same in a direction to set up a repulsive action, and a commutator which retains the armature-conductors in circuit into the position where the reaction between the field and armature prevents current from flowing through said armature-conductor.

4. An alternating-current motor consisting of a closed-circuit-armature machine having opposite commutor-brushes maintained in position approximately ninety degrees from the main brushes and connected directly with one another, said main brushes being connected to a source of alternating currents, all as set forth, whereby current will flow only in two segments of armature-coils and be prevented from flowing in intermediate segments.

Signed at Lynn, in the county of Essex and State of Massachusetts, this 10th day of November, A. D. 1888.

MERLE J. WIGHTMAN.

Witnesses:
J. W. GIBBONEY,
A. L. ROHRER.